United States Patent
Cadeddu

Patent Number: 5,193,345
Date of Patent: Mar. 16, 1993

[54] DISTRIBUTOR OF A FLUID UNDER PRESSURE

[75] Inventor: Leonardo Cadeddu, Crema, Italy

[73] Assignee: Bendix Italia S.p.A., Crema, Italy

[21] Appl. No.: 720,289

[22] Filed: Jun. 25, 1991

[30] Foreign Application Priority Data

Jul. 17, 1990 [IT] Italy ................ 67550 A/90

[51] Int. Cl.⁵ .................... F15B 13/02; F15B 11/08
[52] U.S. Cl. .................... 60/565; 137/627.5
[58] Field of Search ............ 60/565, 566; 137/627.5

[56] References Cited

U.S. PATENT DOCUMENTS

| | | | |
|---|---|---|---|
| 2,985,490 | 5/1961 | Gates | 137/627.5 UX |
| 3,252,471 | 5/1966 | Olson | 137/627.5 X |
| 4,038,999 | 8/1977 | Hayashida | 137/627.5 X |
| 4,077,674 | 3/1978 | Doto | 137/627.5 X |
| 4,079,753 | 3/1978 | Popp | 137/627.5 |
| 4,479,570 | 10/1984 | Kamio | 137/627.5 X |
| 5,036,965 | 8/1991 | Cortesi et al. | 192/85 R |

FOREIGN PATENT DOCUMENTS

| | | |
|---|---|---|
| 0310733 | 4/1989 | European Pat. Off. . |
| 2455662 | 5/1976 | Fed. Rep. of Germany . |
| 2253646 | 7/1975 | France . |

*Primary Examiner*—Gerald A. Michalsky
*Attorney, Agent, or Firm*—Larry J. Palguta; Ken C. Decker

[57] ABSTRACT

The distributor is used for supplying a fluid coming from a source of fluid under pressure and under a pressure which is a function of the pressure of a control fluid. The distributor comprises, in a bore (3) made in a body (1), a double valve consisting, on the one hand, of a first piston (21), one end of which defines with a first plug (5) a control chamber (23) receiving the control fluid, while the other end (27) is pierced with a conduit (29) connected to a reservoir of fluid under low pressure (11), an annular chamber (31) surrounding the first piston (21) and being connected to the consumer circuit of the distributed fluid, and, on the other hand, of a disk (33) forming a shutter and resting on a circular seat (35) stationary relative to the body (1) by way of a return spring (43). The disk (33) is opposite the other end (27) of the first piston, this being capable, under the action of the pressure prevailing in the control chamber (23), of coming up against the disk (33), so as to close communication between the conduit (29) and the annular chamber (31), and then of displacing the disk (33) so as to open communication between a conduit for the inlet of the fluid under pressure and the annular chamber (31). The distributor comprises, furthermore, a second piston (39), one face of which is fixed to the face of the disk (33) opposite the seat (35) of the latter and the other face of which defines with a second plug (7) closing the bore (3) a balancing chamber (41) communicating permanently with the annular chamber (31).

7 Claims, 2 Drawing Sheets

DISTRIBUTOR OF A FLUID UNDER PRESSURE

BACKGROUND OF THE INVENTION

The present invention relates to a distributor of a fluid under a pressure which is a function of the pressure of a control fluid. Such a distributor is used particularly in systems amplifying a manual control, such as a hydraulic actuator employed, for example, for boosting the clutch control on a motor vehicle.

Such a bifluidic distributor is described, for example, in EP-A-0,310,733.

This distributor of a fluid coming from a source of fluid under a first pressure and under a pressure which is a function of the pressure of a control fluid comprises, in a bore made in a body, a double valve means consisting, on the one hand, of a first piston, one end of which defines with a first plug a control chamber receiving the control fluid, while the other end is pierced with a conduit connected to a source of fluid under a second pressure, an annular chamber surrounding the first piston and being connected to the consumer circuit of the distributed fluid, and, on the other hand, of a disk forming a shutter and resting by means of a return spring on a circular seat stationary relative to the body, the disk being opposite this other end of the first piston, this other end being capable, under the action of the pressure prevailing in the control chamber, of coming up against the disk so as to close communication between the conduit and the annular chamber and then of displacing the disk so as to open communication between a conduit for the inlet of the fluid under the first pressure and the annular chamber.

Such a distributor, which, in the document mentioned, was designed particularly for supplying a compressed gas, has a disadvantage of supplying this gas only from a high value of the pressure of the fluid in the control chamber, determined by the pressure of the gas in the source of the inlet of the distributor. This gas in the source of the inlet of the distributor. This threshold or jump is not always desirable in practice.

SUMMARY OF THE INVENTION

An object of the present invention is to overcome this disadvantage.

According to the invention, this object is achieved by adding to such a distributor a second piston, one face of which is fixed to the face of the disk opposite the seat of the latter and the other face of which defines with a second plug closing the bore a balancing chamber communicating permanently with the annular chamber.

Preferably, a duct is made in the disk and the face of the second piston bearing on the disk, and the annular chamber is formed by a shoulder of the first piston.

The circular seat can thus advantageously consist of a cylindrical sleeve slipped round the part of smallest diameter of the first piston and immobilized axially during normal operation of the distributor.

According to one embodiment, a third piston is arranged in the control chamber, so as to define two independent control volumes, in order to cause the distributor to operate as a function of the higher of the pressures of the two control fluids.

In this case, a solenoid valve, for example of the proportional type, can be arranged between the source of fluid under pressure and one of the independent control volumes.

According to another embodiment, a solenoid valve, for example of the proportional type, is connected in such a way as to connect the conduit alternately to a source of fluid under high pressure and to a source of fluid under low pressure.

BRIEF DESCRIPTION OF THE DRAWINGS

The invention will now be described by way of example with reference to the accompanying drawings in which.

DETAILED DESCRIPTION OF THE INVENTION

Figure 1:
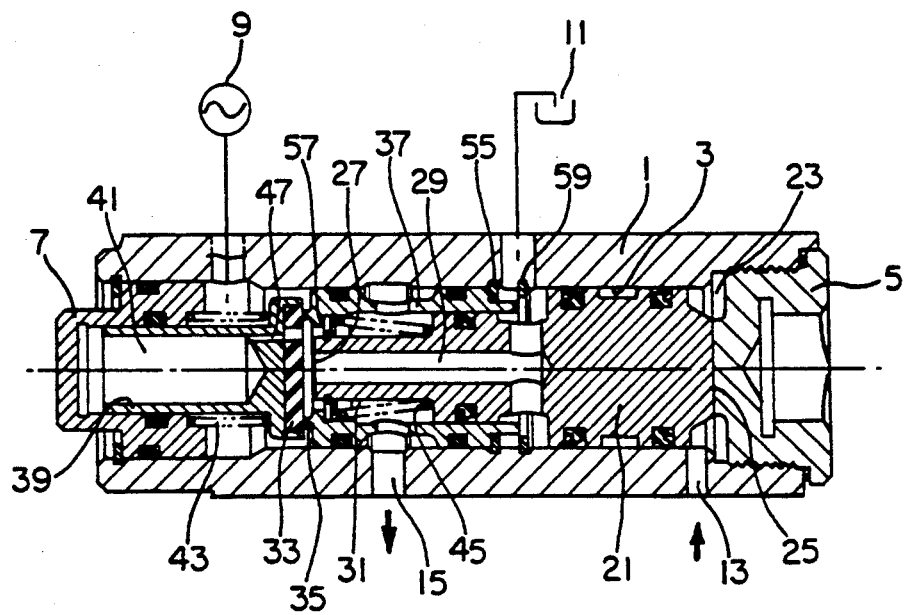
FIG. 1 shows diagrammatically, in section, a distributor according to the present invention.

Referring now to the figures, FIG. 1 shows a distributor produced in a body 1, in which has been made a bore 3 closed on either side by means of plugs 5 and 7. A source of fluid under high pressure 9 and a reservoir of fluid under low pressure 11 are connected to the bore 3 by means of respective conduits. The distributor possesses, furthermore, an inlet for the control fluid 13 and an outlet for the distributed fluid 15.

A first piston 21 slides in the bore 3, and one of its ends 25 defines with the plug 5 a control chamber 23 connected permanently to the inlet 13 of the control fluid.

The other end 27 of this first piston 21 is pierced with a conduit 29, for example of the same axis as that of the bore 3. This conduit 29 communicates with the reservoir 11.

An annular chamber 31 surrounding the piston 21 communicates permanently with the outlet 15 of the distributed fluid.

A preferably elastic disk 33 forming a shutter rests on a circular seat 35 made on a cylindrical sleeve 37 bearing on a stop 55, stationary relative to the bore 3, by means of the pressure of the fluid of the source 9.

A second piston 39 has one end fixed to the disk 33. The disk 33 is, for example, embedded or volcanized in the piston 39. On the other side, the latter defines with the plug 7 a balancing chamber 41. Two return springs 43 and 45 return the assembly into the rest position.

A duct 47 is made in the disk 33 and in the piston 39, in order to put in communication the balancing chamber 41 and the annular chamber 31 which, in the example illustrated, is therefore formed by a shoulder of the piston 21.

The assembly is arranged in such a way that, at rest, the annular chamber 31 communicates with the conduit 29.

The distributor operates as follows. Starting from the rest position shown, a control fluid is introduced into the chamber 23 via the inlet 13. The effect of this is to cause the piston 21 to slide (to the left in the figure) counter to the return spring 45 which bears on the wall 57 of the sleeve 37. As a result of the pressure exerted on the other side of the sleeve 37, the latter remains immobile and the end 27 of the piston 21 comes up against the disk 33, thus interrupting communication between the reservoir 11 and the consumer circuit by closing the conduit 29. The pressure in the chamber 41 is still equal to that prevailing in the consumer circuit.

When the pressure prevailing in the control chamber 23 increases, the disk 33 detaches from its seat 35, thereby opening communication between the source of fluid under high pressure 9 and the annular chamber 31 and consequently the consumer circuit connected to the outlet 15.

Simultaneously, the pressure prevailing in the annular chamber 31 increases, and at a specific pressure the piston 21 is displaced to the right in the figure, until there is a pressure balance, and thus allows the disk 33 to come to bear once again on its seat 35. This pressure is determined by the ratios of the active surfaces, as is well known to an average person skilled in the art.

If the pressure in the chamber 23 increases, the disk 33 moves away from its seat 35 once more, and the cycle begins again.

If the pressure in the chamber 23 decreases, the piston 21 returns towards its rest position, thus opening the conduit 29. The pressure then decreases immediately in the consumer circuit and in the balancing chamber 41 as a result of the return of the fluid used towards the reservoir 11.

This effectively provides a distributor of fluid under a pressure which is a function of the pressure of the control fluid, without an appreciable initial threshold or jump.

In the event of a failure of the source 9, the control fluid in the chamber 23 displaces the piston 21 in the way mentioned above. However, since there is no longer any pressure exerted on the sleeve 37 by the source 9, the displacement of the piston 21 gives rise by means of the spring 45 to the displacement of the assembly consisting of the sleeve 37, the disk 33 and the piston 39. A passage is thus provided for the fluid between the reservoir 11 and the outlet 15 in order to prevent any vacuum in the consumer circuit (chamber 102 of FIG. 3). The displacement of the piston 21 is then limited by a stop 59 fixed to the bore 3.

Figure 2:
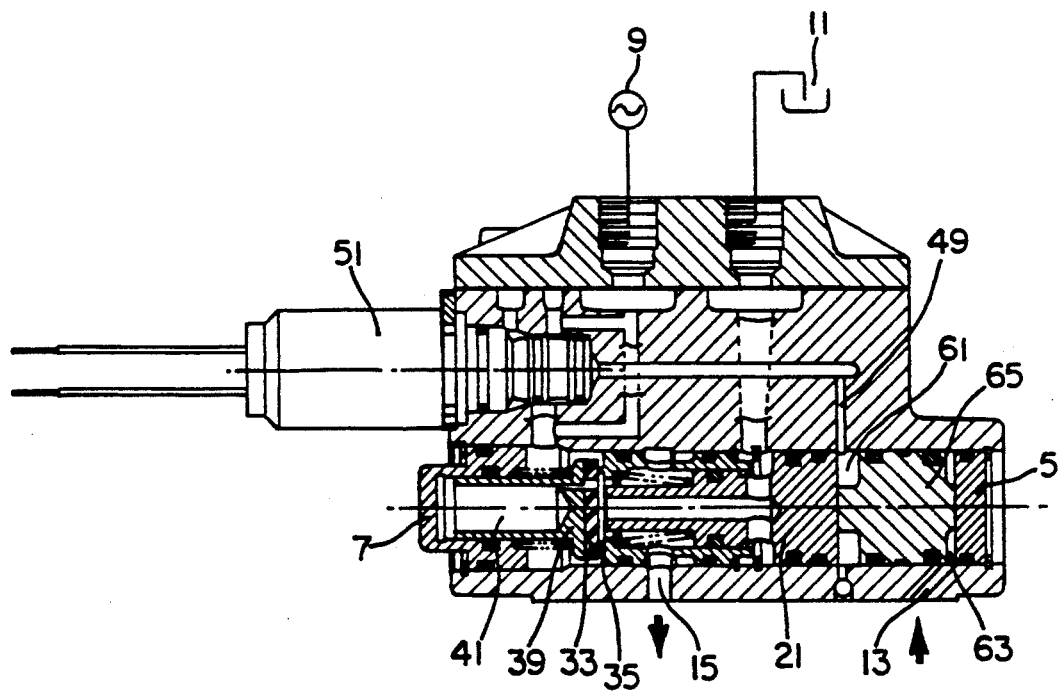
FIG. 2 shows diagrammatically an improvement made to the distributor illustrated in FIG. 1.

In FIG. 2, the distributor possesses, furthermore, a third piston 65 arranged between the first piston 21 and the plug 5, so as to divide the control chamber into two independent volumes 61 and 63. The volume 63 is connected to the inlet 13 of the control fluid, as before, and the volume 61 is connected to an inlet 49 of a second control fluid.

Thus, the distributor supplies a fluid under a pressure which is a function of the higher of the pressures of the two control fluids.

In the embodiment illustrated in this FIG. 2, the second control fluid is supplied by the source 9 and its pressure is modulated by a solenoid valve 51, for example of the proportional type. A system capable of being actuated manually and/or electrically can be provided by this means.

FIG. 3 shows once again the distributor of FIG. 1. It is likewise associated with a proportional solenoid valve. However, the solenoid valve 51 is arranged in such a way as to connect the conduit 29 of the distributor alternately to the source of fluid under high pressure 9 or to the reservoir 11, the source 9 remaining connected upstream of the disk 33 of the distributor, as before.

The solenoid valve 51 controls the position of a slide 53 which makes the above-mentioned alternate connection.

Thus, when the reservoir 11 is connected to the conduit 29, the distributor operates in the way indicated above.

When the source 9 is connected to the conduit 29, the fluid circulates freely from the source to the annular chamber 31 and to the outlet 15, the fluid pressure then being modulated by the solenoid valve 51. The distributor then operates independently of the pressure prevailing in the control chamber 23.

Figure 3:
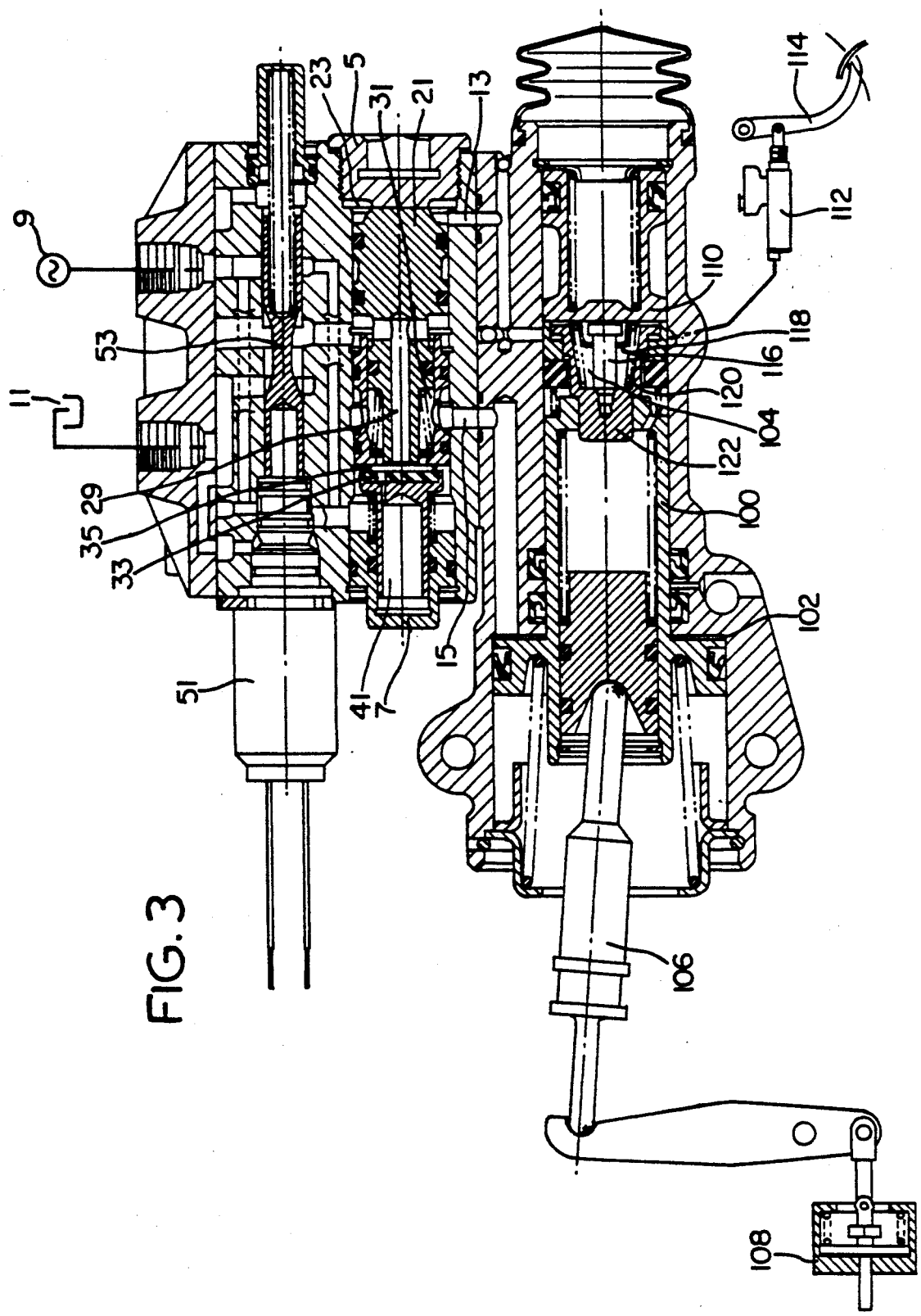
FIG. 3 shows diagrammatically the distributor illustrated in FIG. 1 in a use for a clutch actuator.

FIG. 3 also shows diagrammatically the distributor in a use for the control of a clutch actuator. This use is common to all the above-described embodiments of the distributor according to the invention.

In the example illustrated, the actuator is of the wear take-up type, but this is not necessary. It essentially comprises a stepped piston 100 defining with a corresponding bore two working chambers 102 and 104. This piston 100 ensures the displacement of a rod 106 controlling a clutch mechanism 108. A pedal 114 makes it possible to actuate a transmitter 112 connected to the working chamber 104 and to the inlet 13 of the control chamber 23 of the distributor. The outlet 15 of the distributor is connected to the other working chamber 102 of the actuator.

The device operates in the manual mode in the following way. When the driver presses on the pedal 114, he generates a pressure which causes the piston 100 and the piston 21 to slide. The latter then closes the conduit 29 and detaches the rigid disk 33 from its seat 35. A fluid under pressure is then supplied to the working chamber 102 via the conduit 15, thereby determining a clutch release boost. It should be noted that, by means of the balanced distributor according to the invention, the boost pressure, that is to say the pressure of the fluid in the working chamber 102, is proportional to that prevailing in the working chamber 104 and the driver can thus control the action completely.

The device can also be controlled electrically by energizing the solenoid valve 51 by means of a current of which the intensity is proportional to the pressure of the fluid distributed to the working chamber 102 via the outlet 15.

It will be seen that a movable piston 110 of a type known per se will be displaced at the same time as the piston 100 of the actuator, in order to prevent the working chamber 104 from increasing substantially in volume, that is to say to prevent a circulation of fluid between the transmitter 112 and the chamber 104.

In fact, the fluid under pressure in the working chamber 102 displaces the piston 100 (to the left in FIG. 3), thus driving the piston 122 which is fixed to it. A conical spring 120, which has a load higher than that of the spring located in the inner chamber of the piston 110, maintains the latter in the rest position. When the piston 122 comes in contact with the annular gasket forming a shutter and thereby closes the passage of the fluid between the chamber 104 and the inner chamber of the piston 100, the latter is isolated and forms a hydraulic wall. A screw 116 fixed to the pistons 100 and 122 then comes in contact with a stop 118 of the spring 120. As they continue to be displaced, the pistons 100, 122 and the screw 116 bring about the displacement of the stop 118, the result of which is to cancel the effect of the spring 120 on the piston 110. The latter is then displaced together with the assembly by means of a spring carefully arranged in relation to this piston 110.

It should also be noted that, while the actuator illustrated is operating in one mode, the other mode can be selected by the driver without any negative effect.

Finally, because of the separation of the two fluidic circuits, a failure of one of them does not prevent the other circuit from operating.

An average person skilled in the art will have appreciated that many modifications can be made to the present invention, without departing from the scope of the invention, as defined by the accompanying claims.

For example, the preferred solenoid valve 51 is of the proportional type. However, it would also be possible to use a conventional solenoid valve operating in the all-or-nothing mode by controlling its beat frequency.

What we claim is:

1. A distributor of a fluid coming from a source of fluid under pressure and under a pressure which is a function of the pressure of a control fluid, said distributor comprising, in a bore in a body, double valve means comprising a first piston one end of which defines with a first plug a control chamber receiving the control fluid while the other end of the first piston contains a conduit connected to a reservoir of fluid under low pressure, an annular chamber surrounding said first piston and being connected to a consumer circuit for distributed fluid, and a disk forming a shutter and resting on a circular seat by means of a return spring, said disk being opposite the other end of the first piston, said other end being capable, under the action of pressure prevailing in the control chamber, of coming up against said disk so as to close communication between said conduit and said annular chamber, and of displacing said disk so as to open communication between a conduit for an inlet of said fluid under pressure and said annular chamber, a second piston one face of which is fixed to a face of the disk opposite the circular seat and the other face of the second piston defining with a second plug closing said bore a balancing chamber communicating permanently with said annular chamber, a duct located in the disk and in the face of the second piston bearing on the disk in order to place said annular chamber and said balancing chamber in communication with one another, said annular chamber formed by a shoulder of said piston, said circular seat comprising a cylindrical sleeve located slidably around a small diameter part of said first piston and immobilized axially during normal operation, so that in the event of failure of the source of fluid under pressure the control fluid effects displacement of the first piston, cylindrical sleeve, disk and second piston such that the consumer circuit communicates with the reservoir.

2. The distributor according to claim 1 wherein a third piston is arranged in the control chamber, so as to define two independent control volumes in order to cause said distributor to operate as a function of the higher of the pressures of two control fluids.

3. The distributor according to claim 2, wherein a solenoid valve is arranged between the source of fluid under pressure and one of said independent control volumes.

4. The distributor according to claim 3, wherein said solenoid valve is a proportional solenoid valve.

5. The distributor according to claim 1, further comprising a solenoid valve which connects said conduit alternatively to the source of fluid under high pressure and to the reservoir of fluid under low pressure.

6. The distributor according to claim 5, wherein said solenoid valve is a proportional solenoid valve.

7. A hydraulic actuator, comprising at least one piston and first and second working chambers isolated from one another, a distributor of fluid coming from a source of fluid under pressure and under a pressure which is a function of the pressure of a control fluid, said distributor comprising, in a bore in a body, double valve means comprising a first piston one end of which defines with a first plug a control chamber receiving the control fluid while the other end of the first piston contains a conduit connected to a reservoir of fluid under low pressure, an annular chamber surrounding said first piston and being connected to a consumer circuit of distributed fluid communicating with said second working chamber, and a disk forming a shutter and resting on a circular seat by means of a return spring, said disk being opposite the other end of the first piston, said other end being capable, under action of pressure prevailing in the control chamber, of coming up against said disk so as to close communication between said conduit and said annular chamber, and of displacing said disk so as to open communication between a conduit for an inlet of said fluid under pressure and said annular chamber, a second piston one face of which is fixed to a face of the disk opposite the circular seat and the other face of the second piston defining with a second plug closing said bore a balancing chamber communicating permanently with said annular chamber, and the control chamber of said actuator being connected with the first working chamber and said annular chamber connected with the second working chamber, said circular seat of the distributor comprising a cylindrical sleeve located slidably around a small diameter part of said first piston and immobilized axially during normal operation, so that in the event of failure of the source of fluid under pressure the control fluid effects displacement of the first piston, cylindrical sleeve, disk and second piston such that the second working chamber communicates with the reservoir via the annular chamber to permit displacement of the one piston.

* * * * *